US006636422B1

(12) United States Patent
Tanzer et al.

(10) Patent No.: US 6,636,422 B1
(45) Date of Patent: Oct. 21, 2003

(54) DATA STORAGE SYSTEMS WITH ENHANCED COOLING

(75) Inventors: Herbert J. Tanzer, Folsom, CA (US); Brian Tsuyuki, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 49 days.

(21) Appl. No.: 10/014,905

(22) Filed: Dec. 11, 2001

(51) Int. Cl.[7] .................................................. G06F 1/16
(52) U.S. Cl. ...................... 361/687; 361/685; 361/689; 361/690; 312/332.1
(58) Field of Search .................... 361/685, 687–690; 312/332.1

(56) References Cited

U.S. PATENT DOCUMENTS

| 3,697,084 A | 10/1972 | Ban ............................ 274/4 F |
| 3,959,823 A | 5/1976 | Heidecker et al. ............. 360/99 |
| 3,964,098 A | 6/1976 | Kramer et al. ................. 360/93 |
| 4,062,049 A | 12/1977 | Dirks ............................ 360/78 |
| 4,194,224 A | 3/1980 | Grapes et al. ................. 360/97 |
| 4,349,850 A | 9/1982 | Harvey ....................... 360/74.2 |
| 4,359,762 A | 11/1982 | Stollorz ......................... 360/98 |
| 4,413,328 A | 11/1983 | Videki, II .................... 364/900 |
| 4,633,350 A | 12/1986 | Hanson ......................... 360/98 |
| 4,821,146 A | 4/1989 | Behrens et al. |
| 4,912,580 A | 3/1990 | Hanson .................... 360/98.01 |
| 5,122,914 A | 6/1992 | Hanson .................... 360/98.01 |
| 5,162,980 A | 11/1992 | Morgan et al. |

(List continued on next page.)

FOREIGN PATENT DOCUMENTS

| GB | 808848 | 6/1992 |
| JP | 57-94687 | 2/1956 |
| JP | 50-97454 | 12/1980 |

OTHER PUBLICATIONS

Photographs (copies): 1) Compaq ProLiant; 2) Dell PowerEdge; 3) HP NetServer; 4) IBM Netfinity 1" ; 5) IBM Netfinity 1.6" 6) Sun Ultra Enterprises; 7) HP Disk Array 1994; 8) Trimm Technology 1997; 9) Xyratex Salient Drive Carrier 1997; 10) Symbios 1998; 11) HP Disk Array 1995; 12) DEC Storage Works 1994; 13) HP NetServer LX Pro 1998; 9 pps.
Photograph (copy): Dataflux Rugged Winchester, 5800R "Twinchesters", Signal, 10/82, p. 102.
"Hard Facts About The ROLM Military Hard Disk," Defense Electronics, 10/52, p. 32.
Dataflux disc drives make the grade. Again; Signal, Oct. 1982, p. 102.
Micro–Winchester subsystem is Multibus–compatible, Mini–MicroWorld; Mini–Micro Systems, Jun. 1981, p. 33.
Mil–Spec, From The Ground Up; Signal, Oct., 1982, 3 pps.
Only Miltope flexible disk drives meet the tough standards of the toughest business of them all; Defense Electronics, Mar. 1981, p. 41.

(List continued on next page.)

Primary Examiner—Darren Schuberg
Assistant Examiner—Anthony Q. Edwards

(57) ABSTRACT

Data storage systems are provided. A representative data storage system includes a chassis that is configured to mount at least one data storage device and a carrier. The carrier incorporates a frame and a handle assembly. The frame includes a first and second rails that are spaced from each other and configured to engage opposing sides of a data storage device. Preferably, the first and second rails are formed at least partially of metal for dissipating heat from the data storage device. The handle assembly includes a handle that is configured to move between a latched position and an unlatched position. In the latched position, the handle facilitates secure mounting of the carrier to the chassis. In the unlatched position, the handle facilitates removal of the carrier from the chassis. Other systems and devices also are provided.

17 Claims, 11 Drawing Sheets

U.S. PATENT DOCUMENTS

| | | | |
|---|---|---|---|
| 5,323,298 A | 6/1994 | Shatas et al. | |
| 5,327,308 A | 7/1994 | Hanson | 360/97.01 |
| 5,515,215 A | 5/1996 | Hanson | 360/98.01 |
| 5,517,373 A | 5/1996 | Hanson | 360/98.01 |
| 5,563,748 A | 10/1996 | Hanson | 360/97.01 |
| 5,602,696 A | 2/1997 | Hanson | 360/97.01 |
| 5,682,277 A | 10/1997 | Hanson | 360/97.01 |
| 5,721,669 A * | 2/1998 | Becker et al. | 361/685 |
| 5,764,434 A | 6/1998 | Hanson | 360/97.01 |
| 5,828,546 A | 10/1998 | Tirrell et al. | |
| 5,831,525 A * | 11/1998 | Harvey | 340/507 |
| 5,883,757 A | 3/1999 | Hanson | 360/97.01 |
| 6,091,571 A | 7/2000 | Hanson | 360/98.04 |
| 6,095,862 A | 8/2000 | Doye et al. | |
| 6,097,567 A | 8/2000 | Hanson | 360/97.01 |
| 6,188,576 B1 | 2/2001 | Ali et al. | |
| 6,325,353 B1 * | 12/2001 | Jiang | 248/682 |
| 6,373,696 B1 * | 4/2002 | Bolognia et al. | 361/687 |

OTHER PUBLICATIONS

Calendar, Defense Electronics, Dec. 1962, pp. 51–52.

ASF Pluggable Design, F. Dibble, W. L. Jaskiewicz, W.C. Miller and R.E. Weber; IBM Technical Disclosure Bulletin, vol. 24, No. 1A, Jun. 1981, IBM Corp. 1981, p. 28.

Low–Cost, Rack–Mounted, Direct–Access Disk Storage Device, W.P. Bakkan, R.C. Lentz, F.C. Pexton and J.R. Reidenbach, IBM Technical Disclosure Bulletin, vol. 19, No. 10, Mar. 1977, IBM Corp. 1977.

U.S. patent application Ser. No. 09/809,409 (10012052–1, 50819–1490), entitled "Systems with Enhanced Electrostatic Discharge Protection," filed on Mar. 15, 2001.

U.S. patent application Ser. No. 09/970,189 (10011679–1, 50819–1420), entitled "Systems for Mounting Electronic Component Modules," filed on Oct. 3, 2001.

U.S. patent application Ser. No. 09/896,478 (10011400–1, 50819–1110), entitled "Systems for Mounting Data Storage Devices," filed on Jun. 29, 2001.

U.S. patent application Ser. No. 09/991,095 (1008387–1, 50830–1220), entitled "Systems with Pedestal Stands for Mounting Components," filed on Nov. 16, 2001.

\* cited by examiner

US 6,636,422 B1

DATA STORAGE SYSTEMS WITH ENHANCED COOLING

BACKGROUND OF THE INVENTION

1. Field of the Invention

The present invention generally relates to data storage. More specifically, the invention relates to cooling of data storage devices, such as disk drives, for example.

2. Description of the Related Art

Numerous storage medium carriers, such as disk drive carriers, exist in the computer industry. For instance, some storage medium carriers are adapted to mount within enclosures. Mounting of a storage medium carrier to an enclosure can provide various advantages. In particular, an enclosure-mounted carrier tends to be more secure than a non-enclosure-mounted carrier, in that the enclosure provides a protective barrier about the carrier. Enclosures, however, can be problematic.

By way of example, carriers mounted to enclosures can suffer from cooling deficiencies. More specifically, because an enclosure encases at least a portion of the carrier, the ability to remove heat from a carrier of an enclosure can be inhibited. Unless heat is removed from the carrier at a rate commensurate with the operating characteristics of the carrier, performance of the carrier can be reduced. In some cases, the inability to adequately remove heat from a carrier can result in failure of the ability of the carrier to store and/or retrieve data.

Therefore, there is a need for improved devices, systems, and methods that address these and/or other shortcomings of the prior art.

SUMMARY OF THE INVENTION

The present invention relates to data storage. In this regard, embodiments of the invention may be construed as providing data storage systems. A representative data storage system includes a chassis that is configured to mount at least one data storage device and a carrier. The carrier incorporates a frame and a handle assembly. The frame includes a first rail and a second rail that are spaced from each other and configured to engage opposing sides of a data storage device. Preferably, the first and second rails are formed at least partially of metal for dissipating heat from the data storage device. The handle assembly includes a handle that is configured to move between a latched position and an unlatched position. In the latched position, the handle facilitates secure mounting of the carrier to the chassis. In the unlatched position, the handle facilitates removal of the carrier from the chassis.

Other embodiments of the invention include a carrier that incorporates a frame and a handle assembly. The frame includes a faceplate, a first rail, and a second rail, with the first and second rails extending from the faceplate to engage opposing sides of a data storage device. The handle assembly includes a handle that is configured to move between a latched position and an unlatched position. In the latched position, the handle facilitates secure mounting of the carrier to the chassis. In the unlatched position, the handle facilitates removal of the carrier from the chassis. Means for thermally conducting heat from a data storage device also is provided.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION

Figure 1:
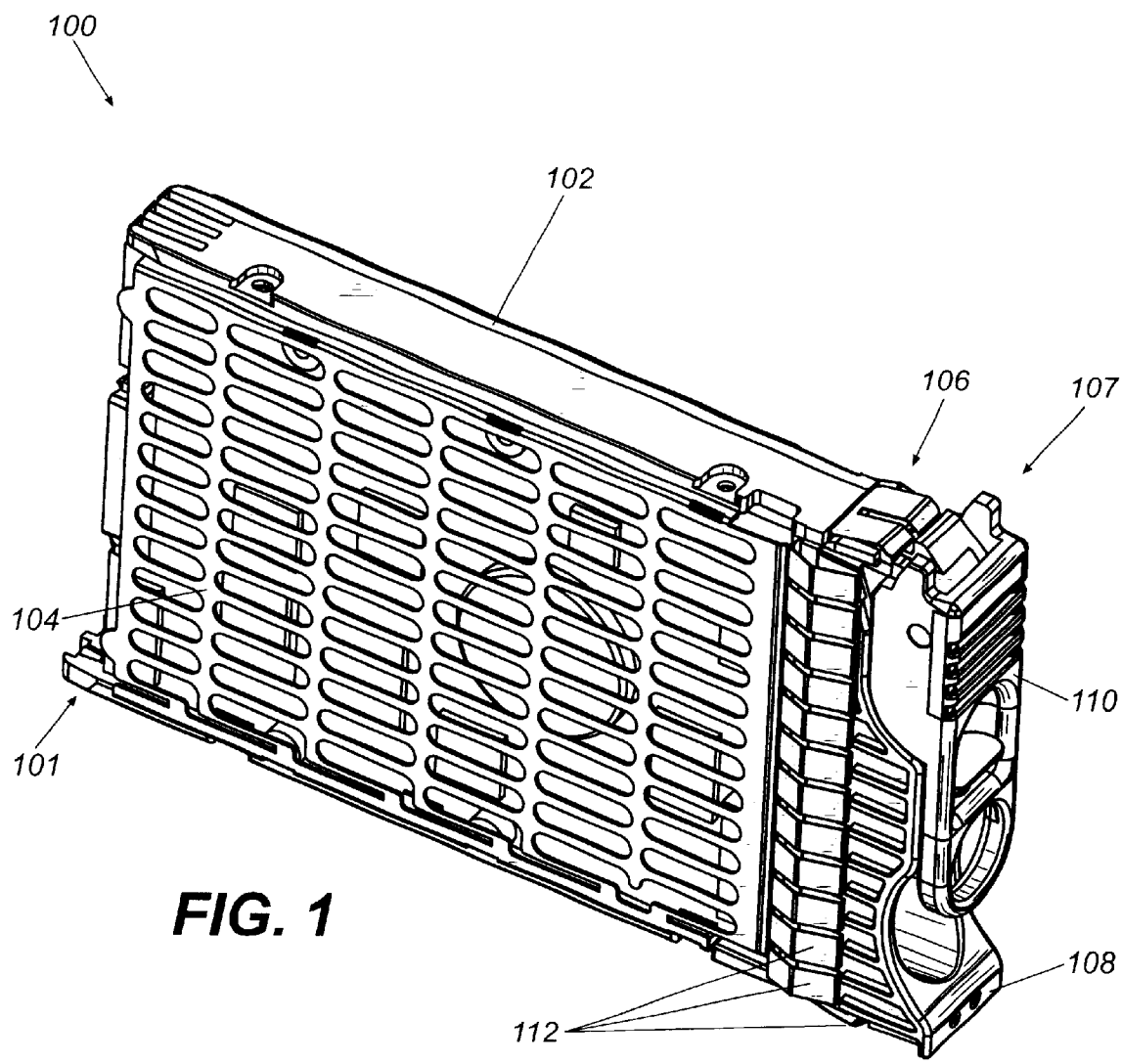
FIG. 1 is a perspective view of an embodiment of a carrier of the present invention.

Reference will now be made in detail to the description of the invention as illustrated in the drawings with like numerals indicating like parts throughout the several views. As shown in FIG. 1, an embodiment of the storage medium carrier 100 of the present invention is configured as a module that is adapted for protecting and/or facilitating mounting of a data storage device, such as a disk drive, for example. The carrier can facilitate mounting of a data storage device to a chassis, which can be configured as an enclosure, a server product, a disk array, etc. Additionally, embodiments of the carrier 100 can be adapted to meet performance requirements of 1" low-profile, 3.5" form factor disk drives, for example. Of course, the invention also can be adapted to meet various other criteria as would be apparent to one of ordinary skill in the art.

As described in greater detail hereinafter, embodiments of the carrier 100 can provide one or more of the following functions: (1) providing cooling of housed data storage device components; (2) providing structural stability to reduce externally and/or internally generated shock and/or vibration dynamics; (3) providing electromagnetic interference (EMI) and/or electrostatic discharge (ESD) control; and (4) improved handling, such as by enabling "hot swap" of the carrier and its associated data storage device between various mounting locations.

The representative embodiment of the carrier 100 depicted in FIG. 1 includes a housing 101, which incorporates a carrier frame 102 and a protective circuit assembly (PCA) cover 104. Frame 102 is sized and shaped for receiving and mounting a data storage device. As used herein, the term "data storage device" refers to any device that is capable of storing data, such as a disk drive, CD ROM, or an atomic resolution storage device, among others. At least partial encasement of such a data storage device within carrier 100 is facilitated by PCA cover 104. PCA cover 104 is adapted to mate with the carrier frame 102. Once so mated, carrier frame 102, PCA cover 104, and a corresponding data storage device cooperate so as to provide a protective enclosure for more sensitive components of the data storage device, such as storage device circuit assembly (not shown). For example, and not for the purpose of limitation, the storage device circuit assembly may be positioned between the PCA cover 104 and an opposing exterior surface of the data storage device.

As shown in the embodiment of FIG. 1, carrier 100 includes an EMI shield 106, and a handle assembly 107, which incorporates a carrier bezel 108 and a handle 110. In some embodiments, handle 110 provides the dual functionality of serving as a carrying handle, which may be utilized for repositioning the carrier, and a locking mechanism for facilitating secure mounting of the carrier to an appropriate chassis or other mounting device. Preferably, the EMI shield incorporates spring fingers 112, described in detail hereinafter.

Figure 2:
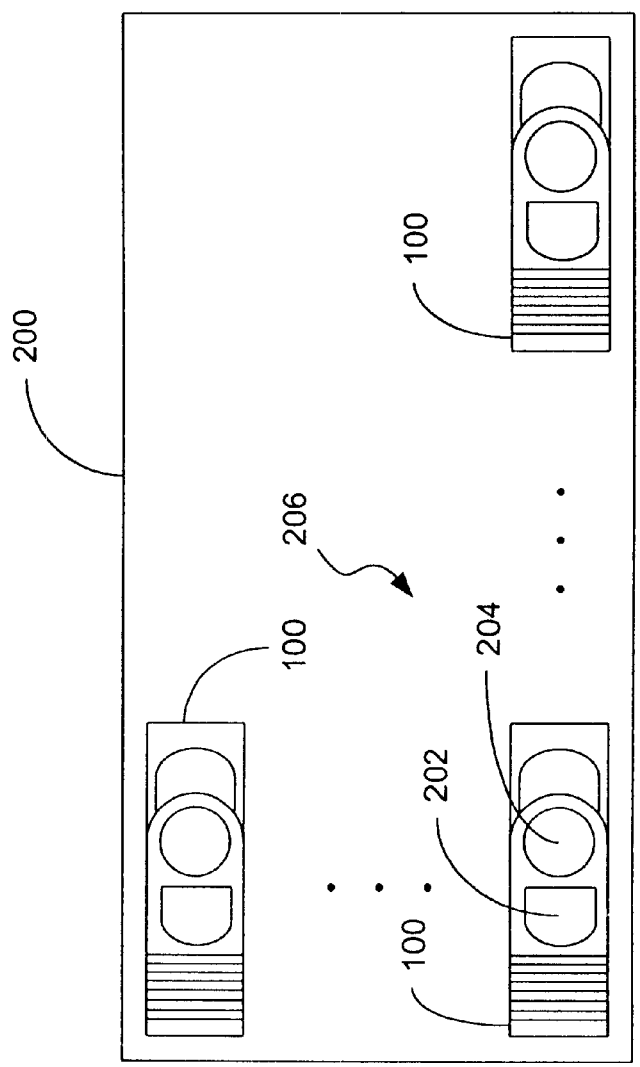
FIG. 2 is a schematic diagram depicting the carrier of FIG. 1 mounted to a representative chassis in a horizontal orientation.

Carrier 100 preferably is adapted to mount within a drive cage or slot of an enclosure. A representative enclosure 200 is depicted schematically in FIG. 2. As shown in FIG. 2, enclosure 200 may facilitate mounting of one or more carriers 100. Typically, mounting of a carrier 100 within enclosure 200 is facilitated by manual insertion of the carrier into an appropriate slot, for example. Insertion and/or removal of the carrier from the appropriate slot may be accomplished without removing power from the carrier. This procedure, commonly referred to as "hot swap," provides a technician with added flexibility as various other slots, and associated data storage device of the slots, do not have to be taken out of service during installation and/or removal of the carrier of interest.

Some embodiments of carrier 100 are provided in a "right-handed" configuration. As utilized herein, the term "right-handed configuration" refers to a carrier configuration that enables a user to conveniently grasp handle 110 with his right hand. This configuration typically is consistent with preferred user-handling.

In regard to carrier 100, the right-handed configuration typically includes providing a bezel opening 202, which is adapted to receive the thumb of the user's right hand, and an opening 204 of the handle, which is adapted to receive another finger of the user's right hand, e.g., an index finger. Preferably, opening 204 is oriented to the right of the bezel opening when the carrier 100 is in a horizontal position, i.e., when PCA cover 104 is in a substantially horizontal plane and is disposed at the bottom side of the carrier.

Figure 3:
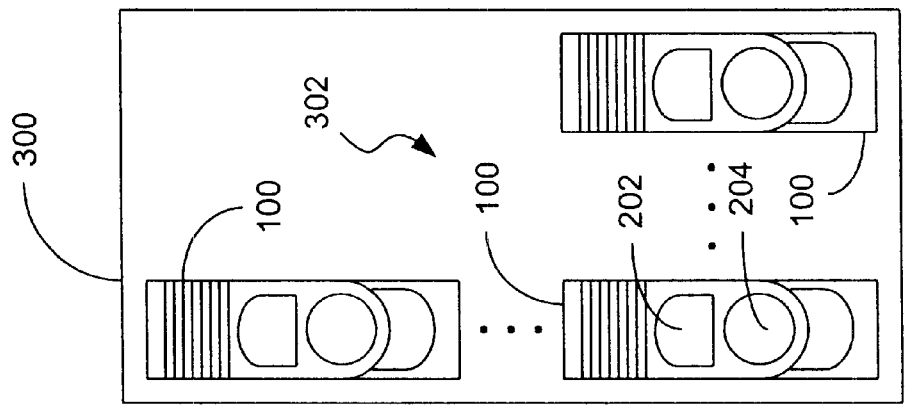
FIG. 3 is a schematic diagram depicting the carrier of FIG. 1 mounted to a representative chassis in a vertical orientation.

As shown in FIG. 2, carrier 100 and its associated data storage device can be arranged in a horizontal mounting position, e.g., position 206. When the carrier is mounted in the horizontal mounting position, the PCA cover 104 generally faces down. In FIG. 3, an alternative enclosure 300 is schematically depicted. Enclosure 300 is configured to receive one or more carriers 100 that are arranged in vertical mounting positions, e.g., position 302. When mounted in the vertical mounting position, bezel opening 202 typically is oriented above opening 204.

Figure 4:
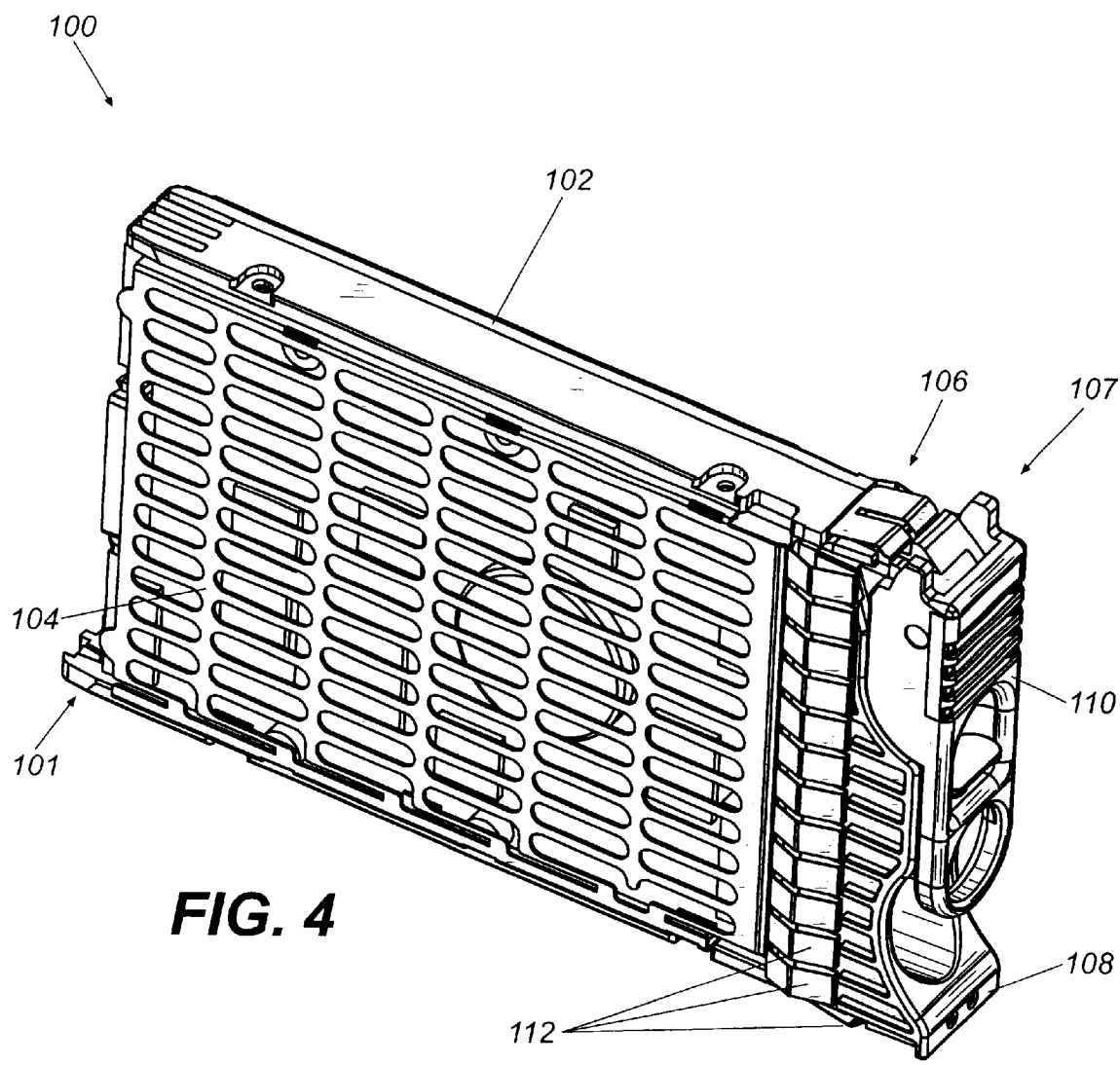
FIG. 4 is a partially-exploded, perspective view of an embodiment of a storage medium module of the present invention, which incorporates a disk drive and the embodiment of the carrier depicted in FIG. 1.

Reference will now be made to FIG. 4 which depicts preferred assembly detail of the embodiment of the carrier 100 depicted in FIG. 1. As shown in FIG. 4, carrier 100 includes frame 102, PCA cover 104, EMI shield 106, bezel 108, and cam handle 110. Frame 102 incorporates a face plate 402 and rails 404 and 406, which extend outwardly from face plate 402. Frame 102 is configured to receive PCA cover 104. By way of example, in the embodiment depicted in FIG. 4, sidewalls 408 and 410 of PCA cover 104 engage between rails 404 and 406, respectively, of frame 102. Sidewalls 408 and 410 are appropriately spaced to receive a data storage device, e.g., a disk drive 412. Thus, the data storage device is received at least partially between sidewalls 408 and 410.

Data storage device 412 and PCA cover 104 preferably are mounted to frame 102 by aligning mounting holes 409 of the data storage device, mounting holes 411 of PCA cover 104, and mounting holes 413 of frame 102. Mechanical fasteners (not shown) then are inserted through the aligned holes. In some embodiments, structural stability of the mounted data storage device 412 is enhanced by a snug fit of device 412 between the sidewalls of the PCA cover. Similarly, a snug fit of the sidewalls of the PCA cover between the rails of frame 102 also may enhance the structural stability of the module. The snug fit of the sidewalls of the PCA cover between the rails of the frame 102 also tends to be promoted by the mechanical fasteners, which draw the rails against the PCA cover as the fasteners are tightened.

One or more thermally-conductive members 413 (one of which is shown in FIG. 4) can be used, in some embodiments, to facilitate the transfer of heat from the storage device 412 to the frame, e.g., rails 404 and/or 406. Such a thermally-conductive member can be formed of a thermally-conductive interface material. The members can be provided in various sizes and shapes depending upon the respective sizes and shapes of the frame and storage device. In FIG. 4, for example, thermally-conductive member 413 is arranged between the inner surface of rail 404 and the side edge of the storage device 412. Another thermally-conductive member (not shown) also can be arranged on the opposing side edge of the storage device.

In addition to providing a protective enclosure for at least a portion of an associated data storage device, in some embodiments, PCA cover 104 can function as a heat sink for the data storage device. In these embodiments, the PCA cover can be formed of a material such as aluminum, for example.

Frame 102 is adapted to engage a lightpipe assembly 414, which will be described in detail hereinafter. Additionally, frame 102 and, more specifically, faceplate 402, is adapted to engage EMI shield 106. EMI shield 106 includes a body portion 420 that defines various apertures. In particular, an array of apertures 422 is provided, with the apertures 422 being sized and shaped to impede and/or prevent the propagation of electromagnetic energy from components arranged behind shield 106, e.g., data storage device 412. In some embodiments, apertures 422 each are configured with a hexagonal shape and also provide the function of enabling air to flow through the shield. This configuration tends to promote cooling of the data storage device 412. Body portion 420 also includes apertures 424 that are adapted to facilitate placement and/or viewing of lightpipe assembly 414.

Preferably, spring fingers 112 depend from body portion 420, such as along an outer periphery of the body portion. Various numbers and configurations of spring fingers 112 may be provided. All such numbers and configurations are considered well within the scope of the invention. The spring fingers preferably provide one or more of the following functions: (1) promoting structural stability to reduce externally and/or internally generated shock and/or vibration; (2) promoting electrical grounding continuity between carrier 100 and a component(s) to which it is mounted, and/or other carriers of such a component(s); and (3) enhancing EMI and/or ESD control of the carrier.

Various aspects of enhancing EMI and/or ESD control of a carrier/chassis system are described in detail in co-pending U.S. patent application Ser. No. 09/809,409 (10012052-1, 50819-1490), entitled "Systems with Enhanced Electrostatic Discharge Protection," filed on Mar. 15, 2001. That application is commonly assigned to the Hewlett-Packard Company and is incorporated herein by reference in its entirety. U.S. patent applications Ser. Nos. 09/896,478 (10011400-1, 50819-1110), entitled "Systems for Mounting Data Storage Devices," filed on Jun. 29, 2001; Ser. No. 09/970,189 (10011679-1, 50819-1420), entitled "Systems for Mounting Electronic Component Modules," filed Oct. 3, 2001; and Ser. No. 09/991,095 (10018387-1, 50830-1220), entitled "Systems with Pedestal Stands for Mounting Components," filed on Nov. 16, 2001, all of which are commonly assigned to the Hewlett-Packard Company, also are incorporated herein by reference.

In FIG. 4, EMI shield 106 includes both forward-facing spring fingers 426 and rearward-facing spring fingers 428 (forward-facing generally referring to a direction away from data storage device 412, and rearward-facing generally referring to a direction toward device 412). Spring fingers 428 preferably extend from flanges 430, which, in combination with the forward-facing spring fingers 426, are adapted to extend about at least a portion of bezel 108.

EMI shield 106 is formed, at least partially, of an appropriate shielding material, such as stainless steel, among others. EMI shield 106 is formed of an appropriate thickness of material or otherwise is configured so as to provide suitable flexibility to one or more of the various spring fingers 112. So formed, the spring fingers preferably deflect in response to a displacement force, such as when engaging a corresponding portion of a chassis cage slot, for example. As the spring fingers tend to be biased to their non-displaced positions (shown in FIG. 4), this configuration enables the flexible spring fingers to serve as dampers for damping encountered shock and/or vibration of the carrier. The flexible configuration of the spring fingers also accommodates variable pitch arrangements of multiple carriers. Additionally, slots 432 formed between adjacent ones of the spring fingers may be appropriately sized and shaped for inhibiting propagation of electromagnetic energy beyond the material of the spring fingers.

Figure 5:
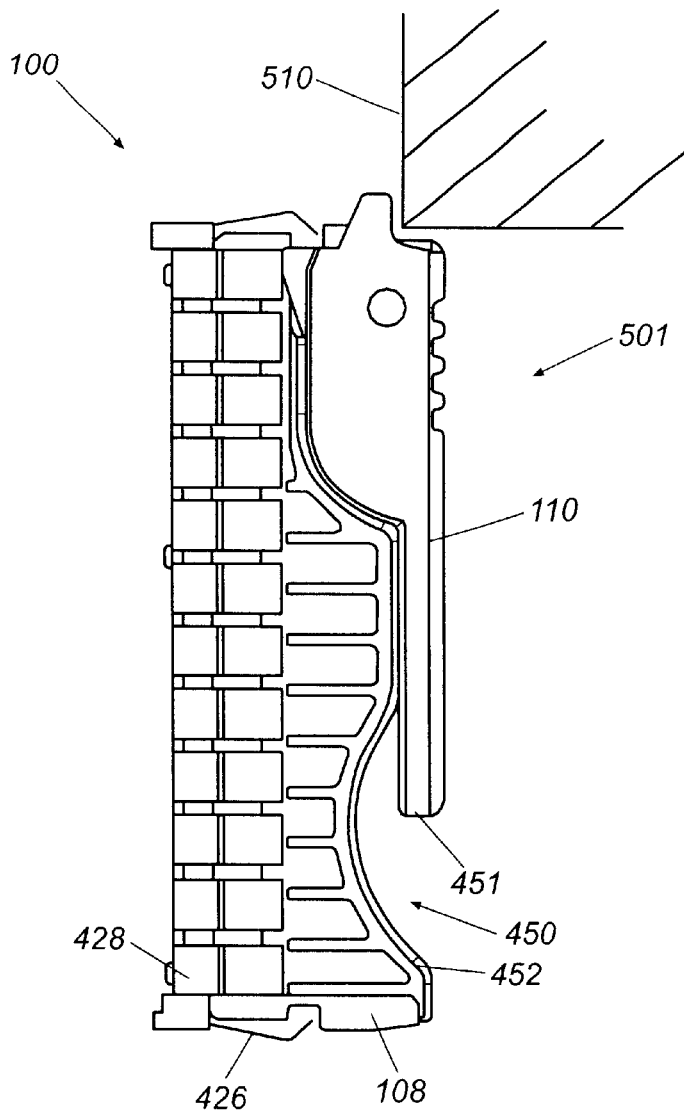
FIG. 5 is a side view of the bezel of the carrier depicted in FIG. 1.

The structure and accompanying functionality of bezel 108 and cam handle 110 will now be described. As shown in FIG. 4, bezel 108 defines an interior cavity 440 that is adapted to receive a thumb latch 442 (described hereinafter). Pivot bosses 444 are adapted to be received within corresponding pivot holes 446 of cam handle 110. Pivot bosses 444 preferably are provided on sidewalls 445 of the bezel, with pivot holes 446 preferably being formed through sidewalls 447 of the cam handle. Engagement of the bosses 444 within the holes 446 permits pivoting of cam handle 110 about the bosses 444 between an open or unlatched position (not shown) and a closed or latched position 501 (depicted in FIG. 5).

As shown in FIG. 4, each of bezel sidewalls 445 preferably incorporates a recessed portion 449 that is adapted to facilitate seating of the cam handle sidewalls 447 when the cam handle is in the latched position. In the embodiment depicted in FIG. 4, the surface defining each bezel sidewall recessed portion 449 extends to form a contoured profile of the bezel that provides appropriate clearance between the bezel and portions of the cam handle during pivoting of the cam handle. This feature also may be seen in FIG. 5, for example.

Bezel 108 preferably includes a recessed portion 450 that is adapted to provide clearance between the distal end 451 of the cam handle and the face 452 of the bezel. This recessed portion enables a finger of a user to be inserted between the distal end of the cam handle and the bezel so as to facilitate grasping and pivoting of the cam handle.

In order to facilitate mounting of carrier 100 into a corresponding chassis cage slot, for example, cam handle 110 incorporates a latching mechanism 459, which can be configured as one or more cam latches 460. In a preferred embodiment, dual cam latches 460 are provided, with each of the latches extending generally upwardly from a sidewall 447 of the cam handle. Cam latches 460 facilitate mounting of the carrier 100 by engaging a corresponding latching surface, such as representative latching surface 510, depicted in FIG. 5. Preferably, spacing of the cam latches from each other is sufficient to enable nesting of the cam latches about a rail of an adjacently disposed carrier. Thus, line-to-line stacking of carriers can be accommodated in some embodiments.

Figure 6:
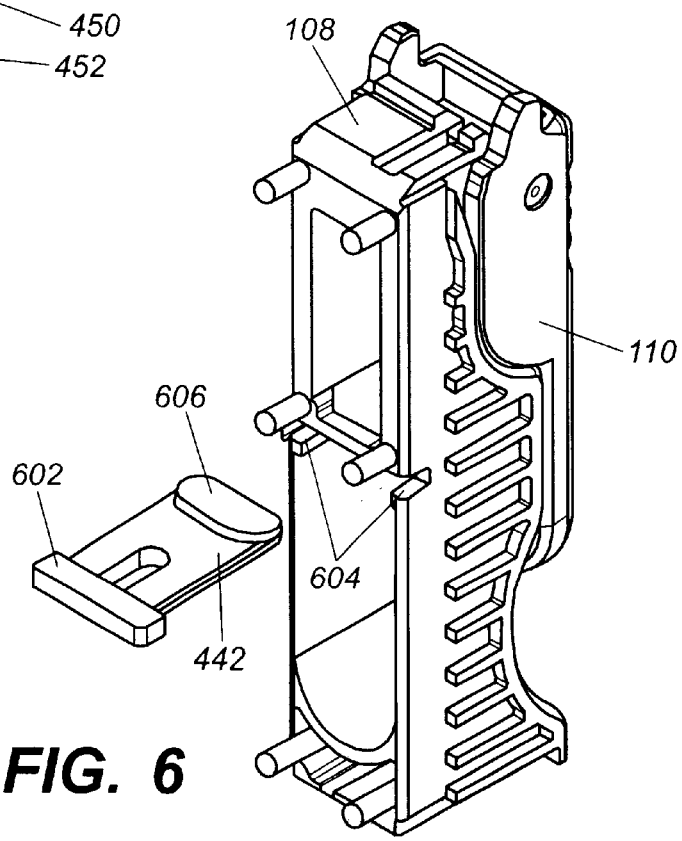
FIG. 6 is a partially exploded, perspective, rear view of the bezel of the carrier depicted in FIG. 1 showing assembly detail of the thumb latch.

As mentioned hereinbefore, bezel 108 receives thumb latch 442. As depicted in FIG. 6, thumb latch 442 is received by bezel 108 by positioning base 602 of the latch within corresponding notches 604 of the bezel. Once so positioned, a protrusion 606 extends through bezel opening 440 and, thus, is appropriately positioned to be received within slot 462 of the cam handle (FIG. 4). In operation, as cam handle 110 is pivoted from the unlatched position to the latched position (depicted in FIG. 5), protrusion 606 is received within slot 462. Thereafter, further rotation of the cam handle toward the latched position causes protrusion 606 to be downwardly deflected until lip 464 of the cam handle extends beyond ledge 468 of the latching member. The downwardly deflected protrusion 606 returns to its unbiased position, thereby forming an interference fit between lip 464 and protrusion 606. The aforementioned interference fit tends to maintain the cam handle in the latched position.

Rotation of the cam handle from the latched position to the unlatched position preferably is facilitated by the user extending a thumb, for example, into opening 202 of the cam handle. The thumb then engages thumb latch 442 and downwardly deflects latching member 606 until the interference fit is disengaged. Thereafter, the cam handle may be rotated toward its unlatched position. This can be accomplished by the user inserting another finger, e.g., an index finger, into opening 204 and grasping the cam handle between the thumb and finger.

Various openings are provided within and through the carrier to promote cooling of a data storage device. For instance, cam handle 110 includes one or more louvers 502 that, in addition to the thumb opening 202 and finger opening 204, are adapted to permit air to flow through the handle. Once passing through the handle, air can flow through cavity 440 of the bezel, and then through the various apertures 422 of the EMI shield 106. After passing through the EMI shield, air can reach data storage device 412 by passing through one or more frame openings 504. Airflow toward and away from the data storage device also is provided by apertures 506 formed through the PCA cover 104. Various materials for promoting cooling of heat-producing components and/or protecting a user from such components may be utilized.

Lightpipe assembly 414 will now be described in greater detail. Lightpipe assembly 414 preferably includes two lightpipes, lightpipes 480 and 482, respectively, that are interconnected by one or more cross ties 484. It should be noted that various other numbers of lightpipes may be utilized in other embodiments, with all such numbers being considered well within the scope of the present invention.

The preferred configuration depicted in FIG. 4 enables lightpipe assembly 414 to be assembled during a single molding operation. In particular, lightpipe assembly 414 can be formed by pouring material into a suitable mold to form both lightpipes and their accompanying cross ties as a unitary structure.

Lightpipe assembly 414 is received within a channel arrangement (pocket) 486 that is formed within a rail of frame 102. Once received within pocket 486, viewing ends 488 of the lightpipes may be viewable and/or extend at least partially through holes 490 of frame 102, holes 424 of EMI shield 106, and holes 492 of bezel 108. So provided, status light information typically provided by one or more light emitting diodes (LEDs) associated with the cage slot of a chassis may be propagated to the user for viewing.

In order to increase the chance for light emitted from the aforementioned LEDs (not shown) to enter the lightpipes, light acceptance cones 494 may be provided at the LED ends of the lightpipes. As the cones have an increased cross-sectional surface area at their distal ends, as compared to the cross-sectional surface area of the cylindrical-shaped portions of the lightpipes, minor misalignment of the lightpipes with the LEDs of the cage slot may be accommodated. Thus, this configuration preferably enables a sufficient amount of light from the LEDs to be propagated through the lightpipes for viewing.

In order to keep lightpipe-to-lightpipe crosstalk to negligible visibility levels, an incident light separator 496 preferably is disposed within the pocket 486. Separator 496 forms a physical partition between the lightpipes that is able to reduce the tendency of and/or prevent incident light from propagating between the lightpipes. At locations where the separator is not present, such as at occurrences of cross ties 484, for example, crosstalk between the lightpipes can be reduced by providing the cross ties with a surface texture that promotes scattering of light. For instance, if the cross ties are configured with a non-smooth surface texture, light provided to the cross ties can tend to scatter and not propagate at full intensity from one lightpipe to the other via the cross ties.

Figure 7:
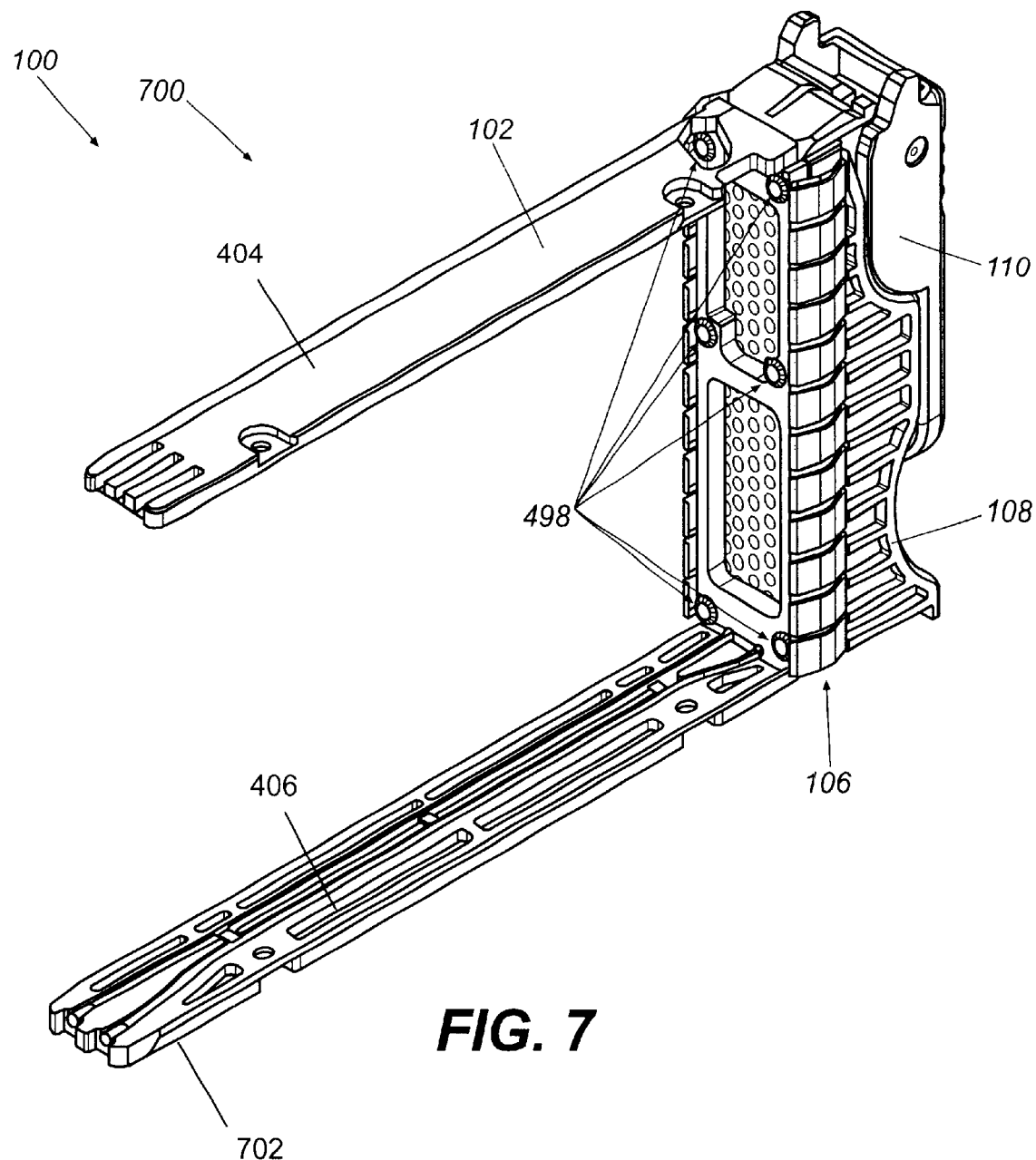
FIG. 7 is a perspective view of the carrier depicted in FIG. 1, showing the frame, EMI shield, bezel, and cam handle in an assembled configuration.

As depicted in FIG. 7 (and with continued reference to FIG. 4), frame 102, EMI shield 106, bezel 108, and cam handle 110 may be assembled to form a carrier assembly 700. More specifically, pivot holes 446 of carrier handle 110 may be received about bosses 444 of bezel 108, and the EMI shield is engaged between the bezel and the frame. In FIG. 7, pins 498 of the bezel may be received within corresponding holes of the EMI shield and frame 102. Thereafter, pins 498 may be substantially prevented from being extracted from the aforementioned holes, such as by heat staking the ends of the pins, thereby securing the frame, EMI shield, bezel, and cam handle together.

In FIG. 7, note that rail 406 is longer than rail 404. Since rail 406 is longer than rail 404, rail 406 can serve as a first contact point between the carrier and the chassis. In particular, the end of rail 406, which extends beyond the end of rail 404, typically would be the first portion of the carrier to contact the chassis during insertion of the carrier into the chassis. In some embodiments, this configuration can permit controlled dissipation of static charge of the carrier and/or chassis associated with the carrier. More specifically, rail 406 can be formed, at least partially, of dissipative material, e.g., a material that is configured to provide a controlled discharge rate of an electrostatic charge of the carrier. In the embodiment of FIG. 7, a contact member 702 is formed at the distal end of rail 406 for controlling the discharge rate of an electrostatic charge of the carrier.

Electro-static discharge ("ESD") can cause relatively high peak currents and resulting fields that can damage or, otherwise, hinder the operability of associated electronic components. In order to reduce the tendency of a potentially damaging ESD event to occur, such as during hot-plugging and/or swapping of a carrier 100, the carrier can be at least partially formed of a dissipative material. For instance, the contact member 702 can be at least partially formed of a dissipative material. As utilized herein, the terms "hot-plugging" and "hot-swapping" refer to the operation of inserting a carrier into and/or removing a carrier from a corresponding chassis while power is operatively applied. The use of dissipative material can prevent metal of the carrier from approaching close enough to the chassis to prompt an ESD event until any charge of the carrier and/or chassis has been sufficiently dissipated.

A dissipative material, such as a conductive plastic, for example, may be used. Such a material can be particularly selected with electrical properties that, in combination with the configuration of the carrier and/or chassis, are intended to avoid electrical arcing between the carrier and the chassis. Noryl HMC1010, by GE Plastics, is a representative example of a suitable conductive plastic.

Dissipative material typically includes a base material, e.g., plastic, and a conductive fill material, such as graphite, for example. Various other base materials and fill materials, however, may be utilized. In some embodiments, the dissipative material may include approximately 10%–20% fill by weight. The amount of fill utilized will, of course, vary depending upon the particular application and requisite mechanical and electrical properties of the material. For instance, one practical upper limit on the amount of fill to be utilized is imposed when the mechanical properties of the material become unsuitable for their intended use. Moreover, one practical lower limit on the amount of fill to be utilized is imposed when the lack of conductivity provided by the material results in metal-to-metal arcing of the charge of the carrier. More specifically, if the resistivity of the material is too high, the charge may not sufficiently dissipate via the material as the carrier approaches the chassis.

Figure 8A:
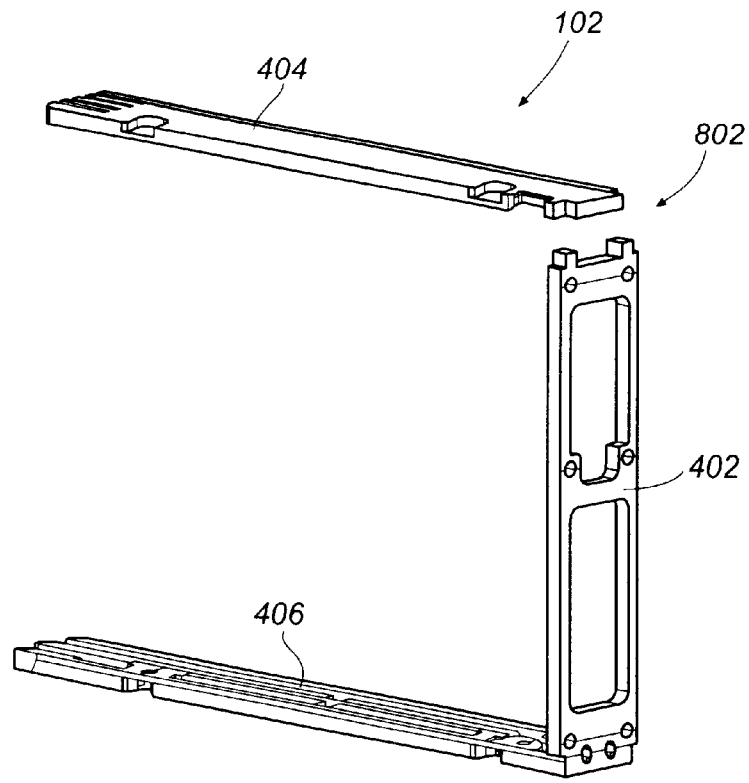
FIG. 8 is a partially-exploded, perspective view of an embodiment of a frame that can be used to implement storage medium modules of the present invention.
FIG. 8B is a perspective view of an embodiment of a frame that can be used to implement storage medium modules of the present invention.
FIG. 8C is a perspective view of an embodiment of a frame that can be used to implement storage medium modules of the present invention.

Several additional embodiments of frame 102 will now be described with reference to FIGS. 8A–8C. Referring first to FIG. 8A, it is shown that faceplate 402 can be joined to rail 404 by dovetail joinery 802. The use of dovetailing can provide a secure joint that also restricts movement of the rail relative to the faceplate in a lateral direction. This construction also tends to mitigate mechanical stresses formed at the front corners of the frame and can assist assembly/handling as the protruding features of the dovetail joint(s) serve as aligning keys for the faceplate and rail(s). Note, dovetailing also is depicted in the embodiments of FIGS. 8B and 8C.

Various materials can be used to form the frames. By way of example, frames can be formed of thermally conductive material(s) that are capable of spreading heat from a storage medium, e.g., a disk drive 412 of FIG. 4. For instance, metals, such as steel and aluminum, as well as dissipative materials (described above) can be used. In some embodiments, an aluminum alloy, e.g., a Al—Zn alloy, can be die cast so that lowcost high-volume production of frames can be achieved.

Figure 8B:
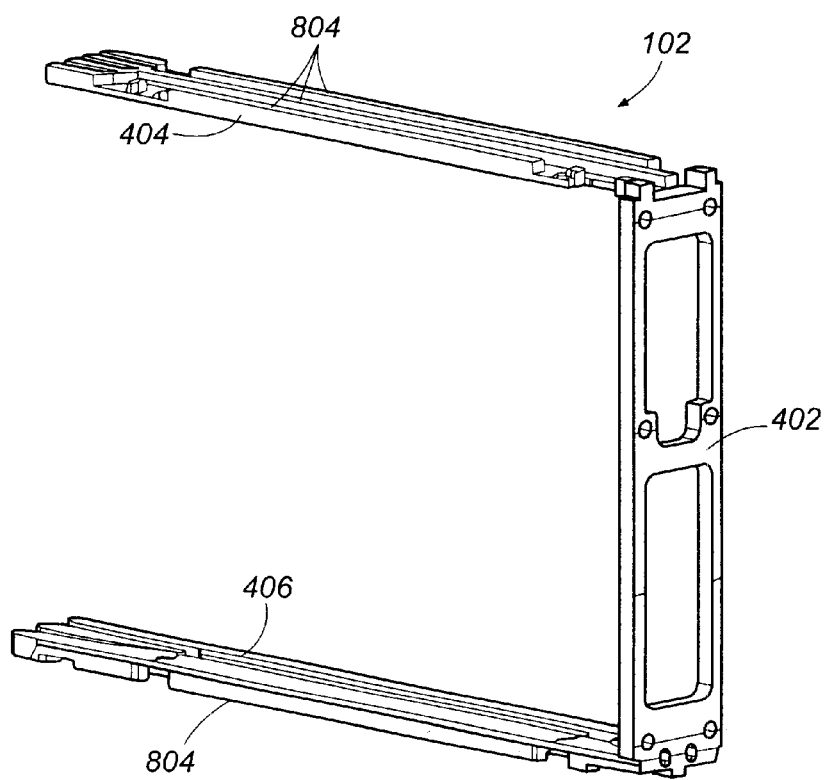

As shown in FIG. 8B, fins 804 can be provided for dissipating heat from a frame 102. In particular, one or more of the rails 404, 406 can incorporate one or more fins 804, each of which provides an increased surface area of the exterior surface of the frame. In FIG. 8B, each of the fins extends longitudinally along a respective rail, although various other arrangements could be used.

Figure 8C:
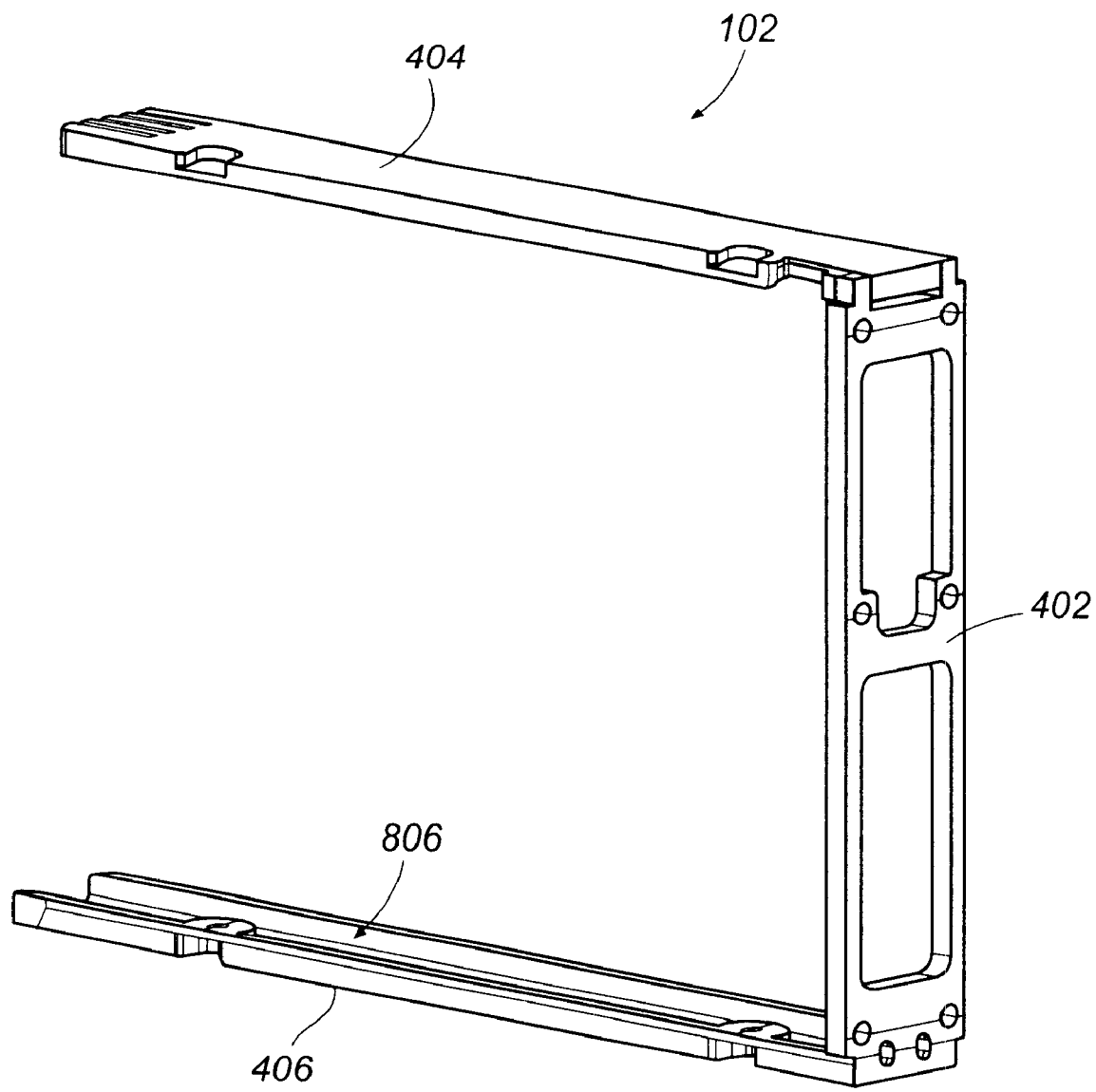

Another cooling feature is highlighted with respect to FIG. 8C. In particular, the frame of FIG. 8C includes a hollowed or recessed interior portion 806 of one or more of the rails. By providing a recessed interior portion(s) 806, cooling air can flow between the rail(s) and the storage medium (not shown), e.g., a disk drive, of the module.

Figure 9:
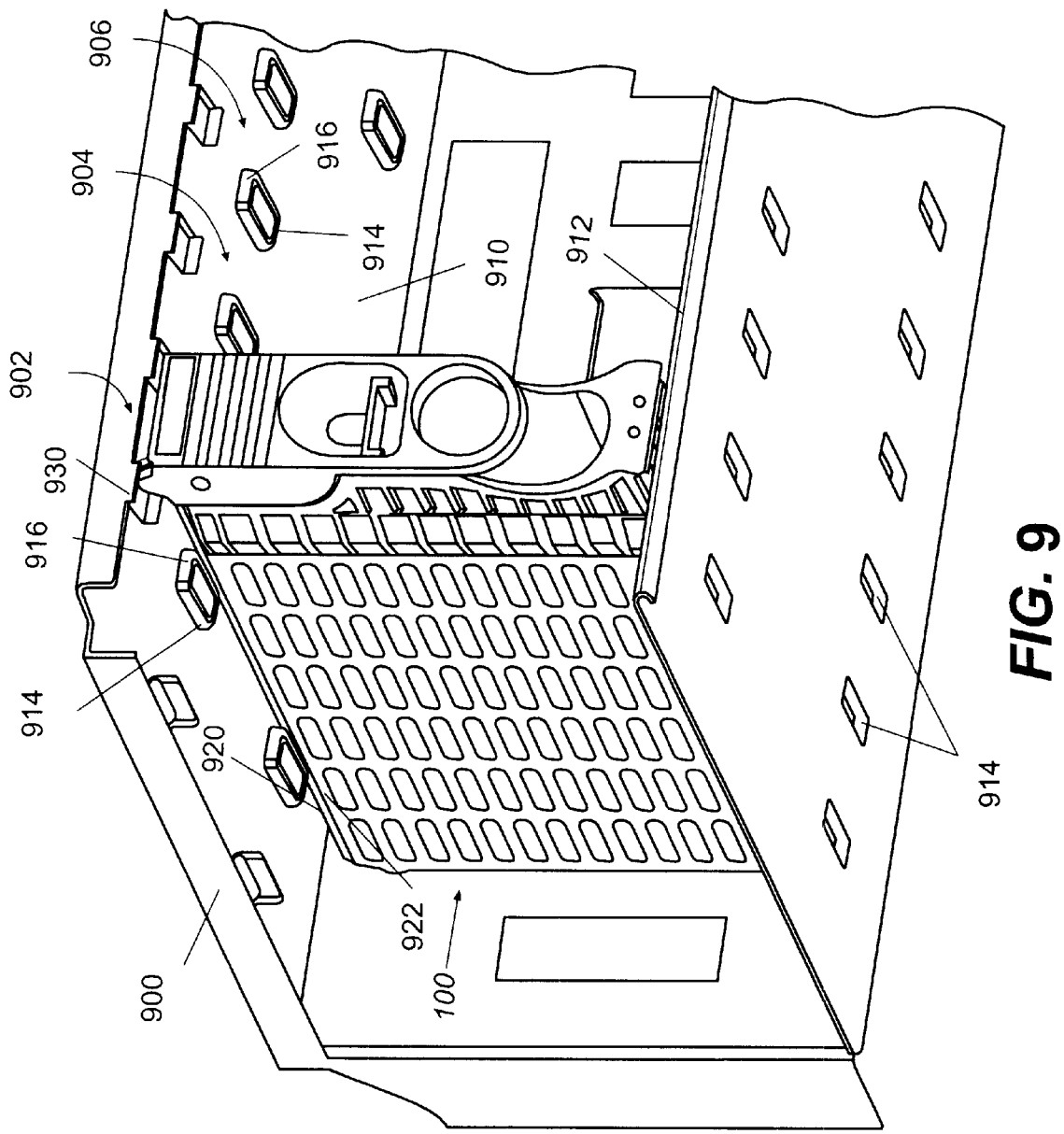
FIG. 9 is a cut-away, perspective view of an embodiment of a chassis of the present invention that is configured to mount one or more carriers in a vertical orientation.

Referring now to FIG. 9, mounting of a carrier 100 to a representative chassis will be described. In FIG. 9, chassis 900 defines multiple slots, e.g., slots 902, 904 and 906, which can accommodate a carrier 100. A carrier 100 is depicted mounted within slot 902 in a vertical mounting position. Slot 902 is defined, at least in part, by an upper wall 910 and a lower wall 912. The walls are spaced from each other at a distance that is sufficient to receive carrier 100. Protrusions 914, some of which extend downwardly from upper wall 910 while others extend upwardly from lower wall 912, are configured to function as alignment guides for the carrier. More specifically, protrusions 914 are configured to engage one or more surfaces of the carrier and tend to align the carrier with its slot as the carrier is slid into the slot. In the embodiment of FIG. 9, protrusions 914 include generally rounded, or otherwise angled, front surfaces 916 that tend to deflect a mis-aligned carrier toward a proper mounting position. The protrusions, which may be configured to engage various surface of a carrier, preferably engage reveal 920. Reveal 920 is defined where the upper portion 922 and lower portion (not shown) of the PCA cover 104 engage the frame rails.

In order to mount the carrier within slot 902, the handle preferably is pivoted to its unlatched position. The carrier is aligned with the slot and inserted rearwardly into the slot. The protrusions 914 preferably align the carrier and permit the carrier to be slid into the chassis to a sufficient depth to enable the cam latches of the handle to pass beyond a latching surface provided by the chassis. In some embodiments, such a latching surface can be formed by a protrusion 930 arranged in the upper wall of the chassis. Once inserted to an appropriate depth, the handle can be pivoted to its latched position so that the cam latches engage the latching surface(s). This secures the carrier within the slot.

Figure 10:
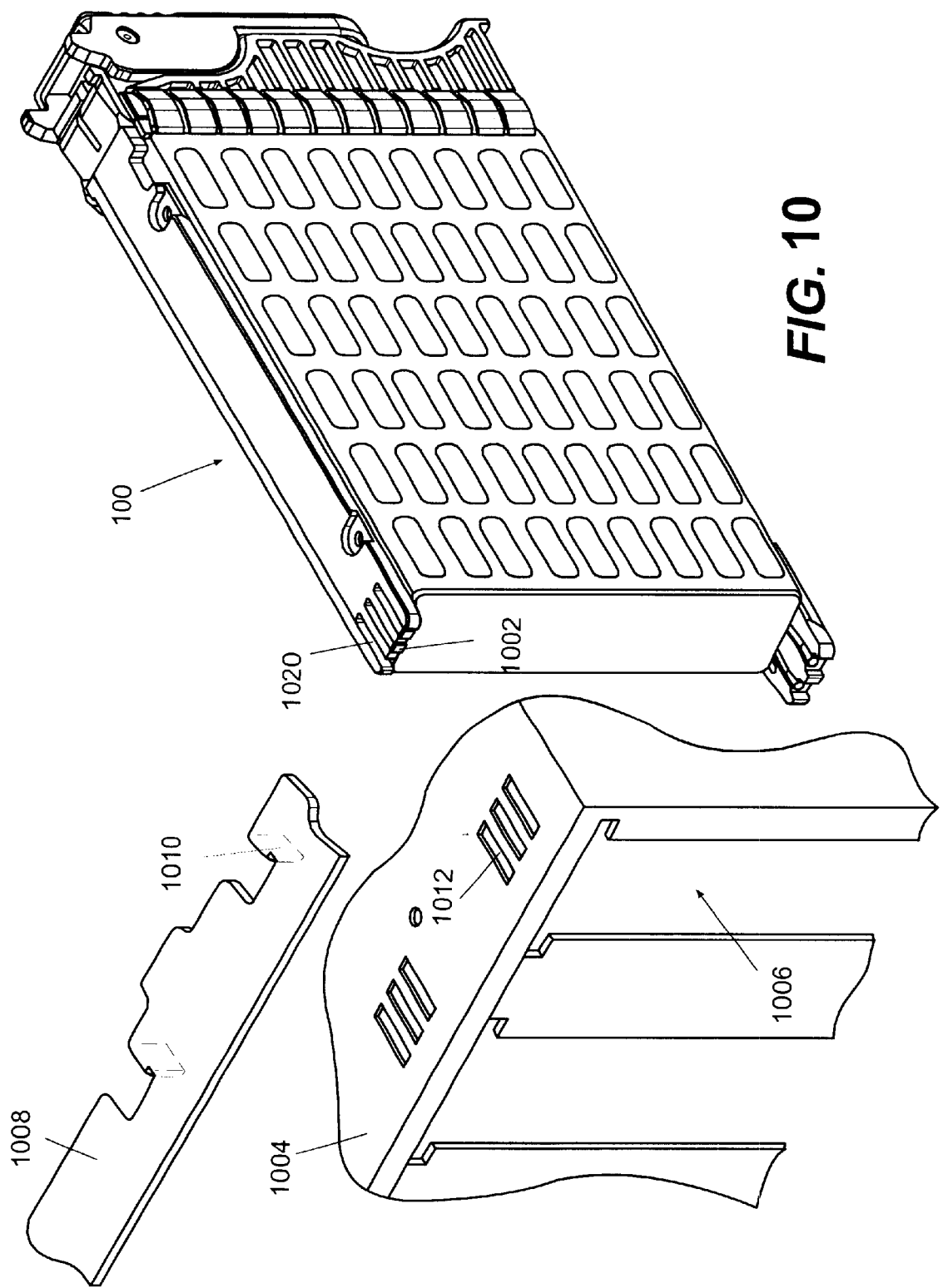
FIG. 10 is a partially exploded, partially cut-away, perspective view of an embodiment of a chassis and carrier, showing detail of the blocking tabs.

In order to avoid potential damage during mounting, e.g., damage to interface connectors of the data storage device mounted to a carrier 100 and/or the interface connectors to which the data storage device is to be interconnected, carrier 100 preferably incorporates one or more blocking tabs 1002 (FIG. 10). Blocking tabs 1002 are configured to interfere with a corresponding key of the chassis if the interface connectors of the data storage device and the chassis are not adapted to mate with each other. For example, as depicted in FIG. 10, chassis 1004 defines a slot 1006 that is to receive carrier 100. Chassis 1004 is configured to engage a blocking assembly 1008 so that one or more keys 1010 of the blocking assembly can protrude into slot 1006. In FIG. 10, multiple key holes 1012 are formed through the chassis at each slot so that key(s) 1010 can extend downwardly through the hole(s) and into their respective slots. In other embodiments, various other configurations of blocking assemblies and/or keys can be utilized. For instance, more than one key per slot could be used in some embodiments.

In order to enable mounting of carrier 100 within slot 1006, the blocking tab of the carrier corresponding to the key location is removed. Once so removed, the protruding key can be received within a key channel of the rail. More specifically, key 1010 can be received by channel 1020. If, however, the blocking tab corresponding to the protruding key is not removed, the key preferably prevents the carrier from being inserted farther within the slot.

Figure 11:
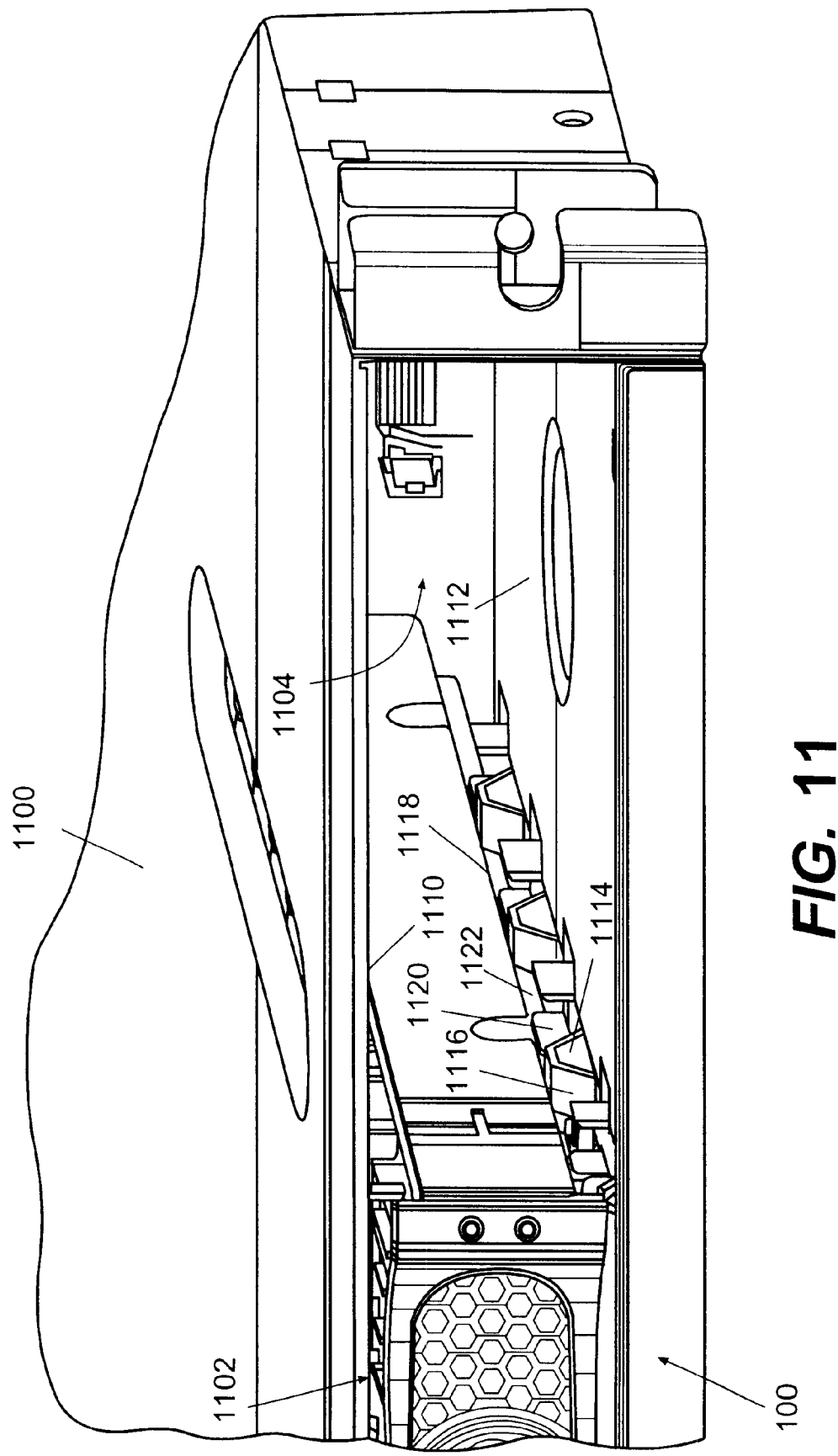
FIG. 11 is a cut-away, perspective view of an alternative embodiment of a chassis of the present invention that is configured to mount one or more carriers in a horizontal orientation.

In FIG. 11, a carrier 100 is shown mounted to another representative chassis. Chassis 1100 of FIG. 11 defines multiple slots, e.g., slots 1102 and 1104, each of which can accommodate a carrier 100. A carrier 100 is depicted mounted within slot 1102 in a horizontal mounting position. Slot 1102 is defined, at least in part, by an upper wall 1110 and a lower wall 1112. The walls are spaced from each other at a distance that is sufficient to receive carrier 100. Protrusions 1114, some of which can extend downwardly from upper wall 1110 while others extend upwardly from lower wall 1112, are configured to function as alignment guides for the carrier. More specifically, protrusions 1114 are configured to engage one or more surfaces of the carrier and tend to align the carrier with its slot as the carrier is slid into the slot. Protrusions 1114 can include generally rounded, or otherwise angled, front surfaces 1116 that tend to deflect a mis-aligned carrier toward a proper mounting position. The protrusions, which may be configured to engage various surface of a carrier, preferably engage side edges of the rails, such as edge 1118 of rail 404.

Also provided are protrusions 1120, some of which can extend downwardly from upper wall 1110 while others extend upwardly from lower wall 1112. Protrusions 1120 are configured to function as supports for the carrier. These protrusions, which also may be configured to engage various surface of a carrier, preferably engage sides of the PCA cover, such as side 1122.

In order to mount the carrier within slot 1102, the handle preferably is pivoted to its unlatched position. The carrier is aligned with the slot and inserted rearwardly into the slot. The protrusions 1114 and 1120 preferably align and support the carrier and permit the carrier to be slid into the chassis to a sufficient depth to enable the cam latches of the handle to pass beyond a latching surface provided by the chassis. In some embodiments, such a latching surface can be formed by a protrusion 1114 and/or a protrusion 1120. Once inserted to an appropriate depth, the handle can be pivoted to its latched position so that the cam latches engage the latching surface(s). This secures the carrier within its slot.

Figure 12:
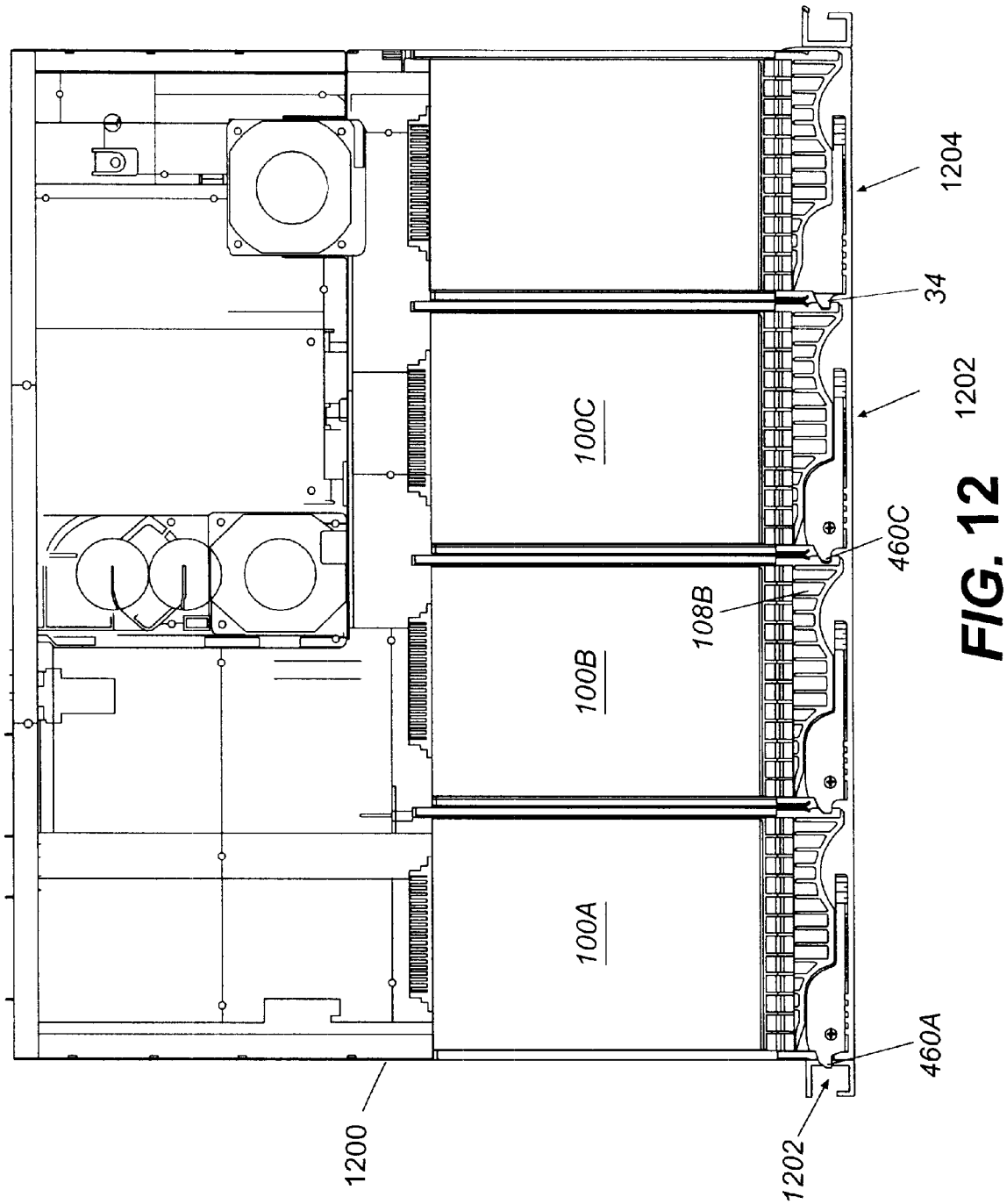
FIG. 12 is a cross-sectional, plan view of the chassis of FIG. 11.

As depicted in FIG. 12, multiple carriers, e.g., carriers 100A, 100B, 100C, and 100D, can be arranged in a top-to-bottom relationship within a chassis. In order to facilitate a relatively high carrier density, cam latches of one carrier, e.g., carrier 100C, can be configured to engage about a portion of an adjacent carrier, e.g., carrier 100B. For example, cam latches 460C are spaced from each other so as to enable a portion of bezel 108B to be received between the cam latches. Also depicted in FIG. 12 is aperture 1202, which is configured to receive cam latches 460A.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A system for mounting a data storage device to a chassis, said system comprising:
    a carrier having a frame and a handle assembly,
    said frame having a faceplate, a first rail, and a second rail, said first rail and said second rail extending from said faceplate, said first rail and second rail being configured to engage opposing sides of a data storage device,
    said handle assembly having a handle configured to move between a latched position and an unlatched position such that, in said latched position, said handle facilitates secure mounting of said carrier to a chassis, and in said unlatched position, said handle facilitates removal of said carrier from the chassis;
    means for thermally conducting heat from a data storage device engaging said carrier; and
    a contact member formed, at least partially, of a dissipative material;
    wherein said first rail has a distal end, said distal end engaging said contact member such that said contact member slows a rate of electro-static discharge from said rail.

2. The system of claim 1, wherein at least one of said rails includes at least one fin, said at least one fin extending outwardly from an exterior surface of said at least one of said rails and providing an increased surface area of said at least one of said rails thereby enhancing heat dissipation of said at least one of said rails.

3. The system of claim 2, wherein said at least one fin extends along at least a portion of the length of said at least one of said rails.

4. The system of claim 1, wherein said means for thermally conducting heat comprises:
    a first thermally-conductive member attached to one of said rails such that said first thermally-conductive member transfers heat from a data storage device engaging said carrier and provides the heat to said one of said rails.

5. The system of claim 4, wherein said means for thermally conducting heat further comprises:
    a second thermally-conductive member attached to the other of said rails such that said second thermally-conductive member transfers heat from the data storage device engaging said carrier and provides the heat to said other of said rails.

6. The system of claim 1, wherein said frame is formed, at least partially, of aluminum.

7. The system of claim 1, wherein said first rail defines a recessed portion, said recessed portion being sized and shaped to permit cooling air to flow between said first rail and a data storage device engaging said carrier.

8. The system of claim 1, wherein said means for thermally conducting heat comprises:
    a cover configured to at least partially encase a data storage device received by said carrier, said cover being formed, at least partially, of aluminum.

9. The system of claim 1, further comprising:
    a data storage device engaging said carrier.

10. The system of claim 1, wherein said carrier has a shield at least partially disposed between said faceplate and said handle assembly, said shield being configured to inhibit propagation of electromagnetic energy directed from the data storage device and toward said shield.

11. The system of claim 9, wherein said carrier has spring fingers arranged at least partially between said handle assembly and said frame, each of said spring fingers being configured as a flexible member, said spring fingers being spaced from each other and protruding about at least a portion of the periphery of said carrier, each of said spring fingers being configured to deflect from a non-displaced position in response to a displacement force such that said spring fingers tend to damp vibration encountered by said carrier.

12. A data storage system comprising:
    a chassis configured to mount at least one data storage device; and
    a carrier having a frame and a handle assembly, said frame having a first rail and a second rail, said first rail and said second rail being spaced from each other and configured to engage opposing sides of a data storage device, said first rail and said second rail being formed at least partially of metal for dissipating heat from the data storage device, said handle assembly having a handle configured to move between a latched position and an unlatched position such that, in said latched position, said handle facilitates secure mounting of said carrier to a chassis, and in said unlatched position, said handle facilitates removal of said carrier from the chassis; and
    a contact member formed, at least partially, of a dissipative material;
    wherein said first rail has a distal end, said distal end engaging said contact member such that said contact member slows a rate of electro-static discharge from said rail to said chassis.

13. The system of claim 12, further comprising:
    a data storage device mounted to said carrier.

14. The system of claim 13, further comprising:
    a cover engaged between said first and second rails, said cover being configured to at least partially encase said data storage device, said cover being thermally coupled to said first and second rails such that heat provided to said first and second rails by said data storage device is dissipated by said cover.

15. The system of claim 13, further comprising:
    a first thermally-conductive member thermally coupled between said data storage device and said first rail, said first thermally-conductive member being adapted to transfer heat from said data storage device to said first rail.

16. The system of claim 12, wherein said contact member engages the exterior of said first rail.

17. The system of claim 12, wherein at least one of said rails includes at least one fin, said at least one fin extending outwardly from an exterior surface of said at least one of said rails and providing an increased surface area of said at least one of said rails thereby enhancing heat dissipation of said at least one of said rails.

* * * * *